Patented June 14, 1938

2,120,579

UNITED STATES PATENT OFFICE 2,120,579

PROCESS OF VULCANIZING LATEX

Fernand Frederic Schwartz, Paris, France, assignor to Cela Holding S. A. Luxemburg, Luxemburg, a corporation No Drawing. Application September 29, 1934, Serial No. 746,272. In France May 18, 1934

7 Claims. (Cl. 18—53)

The impregnation of textiles with vulcanizable latex necessitates very special conditions of fluidity and homogeneity of the bath of rubber. The penetration of the latex to the interior of the textile presents very great difficulties and it is the same for the penetration of vulcanizing elements (zinc and sulphur).

By the present invention the difficulties are overcome and there is produced in the interior of the textiles a perfect penetration and homogeneity of distribution not only of the latex but also of the elements necessary for vulcanization.

For this purpose there is used as vulcanizing product intended to be mixed with the latex, a solution containing in the state of colloidal dispersion the elements (zinc and sulphur) necessary for vulcanization.

This colloidal dispersion is miscible with a solution of latex, the concentration of which may be widely varied and this mixture gives rise to a bath of vulcanizable latex to which may be added any known accelerator, and which is characterized by the absolute dispersion of all its essential elements (latex, zinc, and sulphur). In this bath the particles of zinc and of sulphur are of dimensions substantially equal to those of the globules of latex. They are all distributed in an absolutely homogeneous manner in the bath which ensures their penetration and the perfect homogeneity of their distribution in the interior of the textile.

To obtain the vulcanizing product in question zinc hydroxide or a zinc salt of a weak acid (carbonate, resinate, oleate, ricinolate, etc.) is dissolved in ammonia.

The zinc-ammoniacal solution thus obtained is mixed with a solution of a feebly dissociated organic substance soluble in water in the colloidal form.

As organic bodies for example albumen, ammonium alginate, casein, gelatine, agar-agar, blood serum and amylaceous glues may be employed these substances acting as protective colloids.

To the colloidal dispersion thus obtained there is finally added an ammonium polysulphide solution or a sulphur complex which is weakly dissociated.

There is thus obtained a colloidal dispersion in the body of which there is not produced, due to the ammonia in excess and to the presence of the protective colloids, any precipitation or flocculation notably of sulphur, of zinc, or of albuminate alginate or other organic salt of zinc.

The vulcanizing product thus obtained in the state of a colloidal dispersion and also the vulcanizable latex obtained by admixture of this product and a solution of latex of any concentration (if desired with accelerators) constitute new industrial products.

This vulcanizable latex may be used to impregnate textiles and all porous substances in general, and it may serve in particular to constitute with these latter agglomerates of all kinds.

Finally, all kinds of rubber articles may be made according to known processes with the vulcanizing products obtained above and latex.

The rubber articles, impregnated articles and others obtained according to the present invention exhibit qualities of strength and elasticity very superior to those of the articles made at present.

By way of non-limiting example of the carrying into effect of the invention 50 grams of sodium carbonate are added to an aqueous solution of 100 grams of zinc sulphate. The precipitate of hydrated zinc carbonate thus obtained is well washed and then dissolved in 200 grams of concentrated ammonia.

100 grams of ammonium alginate are swollen with 400 grams of water and the whole is dissolved in 300 grams of the zinc ammoniacal solution previously obtained. To this solution 70 grams of ammonium polysulphide solution are added and the whole is vigorously agitated for about half an hour.

The solution thus obtained is mixed with 2 litres of an ammoniacal dispersion of latex or latex stabilized with ammonia to which may be added to accelerate the vulcanization a few decigrams of a thiocarbamate or xanthate or a mercaptate.

With the colloidal dispersion thus obtained textiles or porous bodies may be impregnated directly and may be vulcanized or not immediately according to the known processes.

What I claim is:

1. Process of manufacture of a vulcanizable latex bath, which consists in dissolving in ammonia a zinc salt of a weak acid, mixing the zinc-ammoniacal solution thus obtained with a protective colloid, and then with a solution of a weakly dissociated sulphur compound having vulcanizing properties, and incorporating the product thus formed into a latex bath.

2. Process of manufacture of a vulcanizable latex bath, which consists in dissolving in ammonia a zinc salt of a weak acid, mixing the zinc-ammoniacal solution thus obtained with an organic protective colloid, and then with a solution of a weakly dissociated sulphur compound having vulcanizing properties, and incorporating the product thus formed into a latex bath.

3. Process of manufacture of a vulcanizable latex bath, which consists in dissolving in ammonia a zinc salt of a weak acid, mixing the zinc-ammoniacal solution thus obtained with an aqueous solution of a substance of the group consisting of albumen, ammonium alginate, casein, gelatine, agar-agar, blood serum and amylaceous glues, and then with a solution of a weakly dissociated sulphur compound having vulcanizing properties, and incorporating the product thus formed into a latex bath.

4. Process of manufacture of a vulcanizable latex bath, which consists in dissolving in ammonia a zinc salt of a weak acid, mixing the zinc-ammoniacal solution thus obtained with a protective colloid, and then with a solution of ammonium polysulphide, and incorporating the product thus formed into a latex bath.

5. Process of manufacture of a vulcanizable latex bath, which consists in dissolving in ammonia zinc carbonate, mixing the zinc-ammoniacal solution thus obtained with a protective colloid, and then with a solution of a weakly dissociated sulphur compound having vulcanizing properties, and incorporating the product thus formed into a latex bath.

6. Process of manufacture of a vulcanizable latex bath, which consists in dissolving in ammonia zinc oleate, mixing the zinc-ammoniacal solution thus obtained with a protective colloid, and then with a solution of a weakly dissociated sulphur compound having vulcanizing properties, and incorporating the product thus formed into a latex bath.

7. Process of manufacture of a vulcanizable latex bath, which consists in dissolving in ammonia zinc resinate, mixing the zinc-ammoniacal solution thus obtained with a protective colloid, and then with a solution of a weakly dissociated sulphur compound having vulcanizing properties, and incorporating the product thus formed into a latex bath.

FERNAND FREDERIC SCHWARTZ.